United States Patent [19]

Deets et al.

[11] Patent Number: 4,971,881

[45] Date of Patent: Nov. 20, 1990

[54] TONER COMPOSITION COMPRISING ROSIN MODIFIED STYRENE ACRYLIC RESIN

[75] Inventors: Gary Deets, East Longmeadow; Richard M. Zielinski, Chicopee Falls, both of Mass.

[73] Assignee: Monsanto Company, St. Louis, Mo.

[21] Appl. No.: 293,805

[22] Filed: Jan. 5, 1989

[51] Int. Cl.$^5$ .............................................. G03G 9/087
[52] U.S. Cl. ..................................... 430/109; 430/137; 527/603; 527/605
[58] Field of Search ................. 430/109, 904, 137; 527/603, 604

[56] References Cited

U.S. PATENT DOCUMENTS

| | | |
|---|---|---|
| 2,069,983 | 2/1937 | Ubben . |
| 2,371,065 | 0/0000 | Powers . |
| 2,447,367 | 0/0000 | Rust et al. . |
| 2,452,870 | 0/0000 | Rust et al. . |
| 2,479,516 | 0/0000 | Rust et al. . |
| 2,753,308 | 7/1956 | Landrigan et al. . |
| 3,061,564 | 10/1962 | Zdanowski . |
| 3,510,338 | 5/1970 | Vabrow . |
| 3,778,262 | 12/1973 | Queener et al. . |
| 3,928,656 | 12/1975 | Strella et al. . |
| 3,965,021 | 6/1976 | Clemens et al. . |
| 3,969,251 | 7/1976 | Jones et al. . |
| 3,985,664 | 10/1976 | Sakaguchi et al. . |
| 3,985,665 | 10/1976 | Sakaguchi et al. . |
| 3,997,487 | 12/1976 | Watkin et al. . |
| 4,002,585 | 1/1977 | Oishi et al. . |
| 4,021,358 | 5/1977 | Tomono et al. . |
| 4,035,320 | 7/1977 | Lawson . |
| 4,068,017 | 6/1978 | Westdale ............................ 430/109 |
| 4,162,997 | 7/1978 | Walsh ................................. 524/274 |
| 4,169,821 | 10/1979 | Werner et al. . |
| 4,195,169 | 3/1980 | Priddy ................................ 528/500 |
| 4,206,247 | 6/1980 | Mitsuhashi et al. . |
| 4,284,701 | 8/1981 | Abbott et al. . |
| 4,322,326 | 3/1982 | Pyle . |
| 4,411,975 | 10/1983 | Lu et al. . |
| 4,415,646 | 11/1983 | Gruber et al. . |
| 4,418,191 | 11/1983 | Irvin ................................... 528/500 |
| 4,423,207 | 12/1983 | Fleck et al. ........................ 528/500 |
| 4,434,220 | 2/1984 | Abbott et al. . |
| 4,460,672 | 7/1984 | Gruber et al. . |
| 4,469,770 | 9/1984 | Nelson . |
| 4,493,883 | 1/1985 | Gruber et al. . |
| 4,508,806 | 4/1985 | Oseto et al. ....................... 430/109 |
| 4,535,049 | 8/1945 | Honda et al. ..................... 524/275 |
| 4,537,848 | 8/1985 | Yourd et al. . |
| 4,552,592 | 11/1985 | Rudolphy et al. . |
| 4,556,624 | 12/1985 | Gruber et al. . |
| 4,562,135 | 12/1985 | Winnik et al. . |
| 4,563,409 | 1/1986 | Suzuki et al. . |
| 4,578,338 | 3/1986 | Gruber et al. . |
| 4,612,272 | 9/1986 | Westdale . |
| 4,612,273 | 9/1986 | Westdale et al. . |
| 4,613,559 | 9/1986 | Ober et al. . |
| 4,814,249 | 3/1989 | Oseto et al. ....................... 430/109 |

FOREIGN PATENT DOCUMENTS

| | | |
|---|---|---|
| 0058355 | 5/1982 | European Pat. Off. . |
| 57-14662 | 1/1982 | Japan . |
| 60-8850 | 1/1985 | Japan ................................. 430/109 |
| 61-188545 | 4/1986 | Japan ................................. 430/109 |
| 61-176621 | 8/1986 | Japan . |
| 62-184469 | 8/1987 | Japan ................................. 430/109 |

*Primary Examiner*—Ronald E. Martin
*Attorney, Agent, or Firm*—Fishman, Dionne & Cantor

[57] ABSTRACT

A toner composition for use in electrophotography comprises a rosin modified styrene-acrylic binder resin which has been prepared by steam stripping a mixture solution polymerized styrene acrylic copolymer resin, rosin and a suitable solvent such a toluene or xylene followed by cooling and grinding to form styrene acrylic/rosin binder resin. This binder resin is then formulated with conventional coloring pigments, charge controlling dyes and carriers such as iron powder or glass beads to provide dry toner compositions of high positive charge. An important feature of the present invention is that the styrene acrylic/rosin binder resin will have an inherent positive charge of at least 2.0. This inherent positive charge is in contrast to typical prior art toner binders which are inherently negatively charged. As a result, the toner composition of this invention needs much less of addition of charge control agent to bring the positive charge to the required +10 to +12; thereby leading to far lower manufacturing costs.

11 Claims, No Drawings

TONER COMPOSITION COMPRISING ROSIN MODIFIED STYRENE ACRYLIC RESIN

BACKGROUND OF THE INVENTION

This invention relates generally to a reprographic dry toner composition. More particularly, this invention relates to a toner composition for use in electrophotography comprising a novel rosin modified styrene/acrylic binder resin prepared from a mixture of solution polymerized styrene acrylic copolomer, rosin and a suitable solvent such as toluene or xylene.

In electrophotographic printing, generally a uniform electrostatic charge is applied to a photoconductive insulating layer and the resulting charged surface selectively exposed to electromagnetic radiation so as to dissipate the charge in those areas exposed to the radiation, thereby producing an electrostatic latent image. The resulting latent image is subsequently developed by depositing (typically by use of the well known "cascade" method) a finely divided electroscopic developer material, referred to as toner, on the electrostatically formed image. Generally speaking, the charged toner particles will have a charge opposite to the residual electrostatic charge image so that the toner particles adhere to the charged areas to form a visible image. This image may be fixed in situ on the support or transferred to a secondary support surface and the transferred image permanently affixed to the secondary support surface.

Two component developer mixtures are conventionally used to develop electrostatic latent images, comprising a pigmented resinous toner powder and a carrier component wherein the carrier component is substantially larger in size than its toner complement. The toner particles, which are generally made of a fine pigmented resinous material, are charged triboelectrically by rubbing against the carrier particles causing them to adhere electrostatically. The composition of the developer mix is chosen such that the toner particles will acquire an electrostatic charge of a polarity opposite to that of the electrostatic image to be developed. As a result, when the developer is brought into contact with the electrostatic latent image, the toner particles are attracted from the carrier particles and selectively deposited onto the electrostatic image by the electrostatic charge of the image. The powder or toner image that is obtained is either fixed in situ on the surface of the image bearing substrate or the powder image selectively transferred to a receiving surface to which it is then fixed. The fixing process can reflect any one of several approaches such as pressure fixing, vapor fixing or heat fusing depending upon the specifics of the particular system.

In another form of development utilizing a developer mix comprising a carrier and toner component, a developer composition containing toner and magnetic carrier particles is transported by a magnet. The resulting magnetic field causes alignment of the magnetic carrier into a brush like configuration. This magnetic brush is engaged with the electrostatic image bearing surface, and the toner particles supported on the brush like configuration are drawn from the "brush" to the latent image by electrostatic attraction. Thus, a developer mixture may be provided comprising a toner material and a carrier material which consists of particles which are magnetically attractable. Such a configuration is generally referred to as a magnetic brush development system (as opposed, for example, to the cascade method which often uses glass beads as the carrier).

When the non-exposed portion of the surface of the photosensitive layer, prior to the developing step, is charged with a negative electric charge after charging and exposure, a positive picture cannot be obtained unless it is developed with a toner which is charged with a positive electric charge. However, most resin powders imparted with friction by the cascade method (using glass beads as the carrier) or by the magnetic brush method (using iron powder as the carrier) are charged with a negative charge, and very few of them are charged with a positive electric charge.

In order to impart to the toner either a strong negative or positive charge, it is necessary to add a charge control agent. Typically, such charge control agents comprise any one of a number of known dyes. Because the vast majority of known toner compositions have inherently negative charges, large amounts of charge control dyes (e.g. basic dyes) must be used to provide a strong positive charge (e.g. about $+10$ to $+12$) to the toner when a positively charged toner is needed (as is often the case). It will be appreciated that the addition of such positive charge control agents will add additional costs in materials acquisition and processing. Accordingly, there is a perceived need for a toner composition which has an inherent positive charge and so requires relatively smaller quantities of a charge control agent for developing a positive picture.

Another well known problem with conventional toner compositions is that the charge control additive both does not admix well in the toner compositions, nor does it disperse uniformly therein. As a consequence, the surfaces of the resulting toner particles are not charged uniformly, either negative or positive, thereby causing fogging or trailing phenomena at the development stage; and thereby preventing the obtaining of clear and sharp developed images.

SUMMARY OF THE INVENTION

The above-discussed and other drawbacks and deficiencies of the prior art are overcome or alleviated by the positively charged dry toner composition of the present invention. In accordance with the present invention, a toner composition for use in electrophotography comprises a rosin modified styrene-acrylic binder resin which has been prepared by steam stripping at 250° C. a mixture of solution polymerized styrene acrylic copolymer resin, rosin and a suitable solvent such as toluene or xylene. After the solvent has been removed, the mixture is cooled and ground to form a styrene acrylic/rosin binder resin. This binder resin is then formulated with conventional coloring pigments, charge controlling dyes and carriers such as iron powder or glass beads to provide dry toner compositions of high positive charge.

An important feature of the present invention is that the styrene acrylic/rosin adduct will have an inherent positive charge of at least 2.0 volts/g. This inherent positive charge is in contrast to typical prior art toners which are inherently negatively charged (e.g. typically $-14$ to $-6$). As a result, the toner composition of this invention needs much less of an addition of charge control agent to bring the positive charge to the required $+10$ to $+12$; thereby leading to far lower manufacturing costs.

Still another important feature of the rosin modified styrene acrylic binder resin of this invention is its compatability with certain polymers which provides uniform dispersion of conventional toner additives thereby diminishing the fogging and trailing phenomena.

The above discussed and other features and advantages of the present invention will be appreciated and understood by those of ordinary skill in the art from the following detailed description and drawings.

DESCRIPTION OF THE PREFERRED EMBODIMENT

In accordance with the present invention a toner binder resin having both a positive charge and compatability with certain polymers is prepared by combining a solution polymerized styrene acrylic copolymer resin (still in solution) with rosin and a suitable solvent such as xylene or toluene. This mixture is stirred until a homogenous solution is obtained. The ratio of rosin to styrene acrylic resin is preferably in the range of 9:1 to 1:9 by weight.

In the next step, the solvent is stripped from the solution under reduced pressure and heat. Preferred results are obtained using a distilled solvent steam stripping at about 250° C. In the final stage of stripping, steam may be injected directly into the resin mass to aid in the stripping. The stripped resin is then heated to 250° C., cooled and ground to define a toner binder resin which exhibits a glass transition temperature of about 58° to 60° C., is compatible with larger resins such as nitrocellulose, and is positively charged.

The styrene acrylic resin initially mixed with the rosin must be prepared using solution polymerization techniques to obtain the desirable toner properties of positive charge and compatability. Solution polymerized styrene acrylic resin is commercially obtainable (still in solution form) under the tradename RP-1215 from Monsanto Chemical Company (assignee of the present invention). Alternatively, the solution polymerized styrene acrylic resin may be prepared from known methods such as the following procedure:

Acrylate monomers such as ethyl acrylate, ethyl methacrylate, butyl acrylate and butyl methacrylate and styrene comonomers are copolymerized by vinyl addition polymerization with up to 10 weight percent of acrylic acid or methacrylic acid to provide an acid modified acrylic polymer. The copolymerization is carried out in a suitable solvent such as toluene or xylene.

The rosin used in the present invention may comprise any known rosin, preferably a gum rosin such as CHINESE SAILING BOAT brand gum rosin from PDM Inc.

A typical formulation of the toner binder of the present invention comprises:

| | |
|---|---|
| RP-1215 | 69.7 g |
| Rosin | 23.3 g |
| Xylene | 7.0 g | where the RP-1215, rosin and xylene are charged to a flask with stirrer and sparge tube. The mixture is heated to 250° C., and steam stripped at 250° C. to a 6:1 water to oil ratio. The stripped rosin modified styrene acrylic resin is then poured into a pan, cooled and ground to define a dry toner binder.

The dry toner binder may be combined with any of the known conventional coloring pigments, charge controlling dyes and carriers such as iron powder or glass beads to provide a dry toner composition for use in either the cascade or brush method of electrophotographic printing. For example, toner may be produced by dry blending 92g of rosin modified styrene acrylic with 8 g carbon followed by compounding on a two roll mill for 5 minutes at 125° C.

Referring now to TABLE 1, five comparative examples are given for different toner binder compositions comparing charge and flow/toughness balance. In addition, TABLE 1 also compares a styrene acrylic copolymer resin made using suspension polymerization techniques (e.g. Piccotoner 1221 manufactured by Hercules Company) to a solution polymerized styrene acrylic resin (e.g. RP-1215) in accordance with the present invention.

TABLE I

| | Ex. 1 | Ex. 2 | Ex. 3 | Ex. 4 | Ex. 5 |
|---|---|---|---|---|---|
| Monsanto RP-1215 | 92.0 | 0.0 | 0.0 | 71.8 | 55.2 |
| Hercules Piccotoner 1221 | 0.0 | 92.0 | 71.8 | 0.0 | 0.0 |
| Rosin | 0.0 | 0.0 | 20.2 | 20.2 | 36.8 |
| Carbon | 8.0 | 8.0 | 8.0 | 8.0 | 8.0 |
| Q/M | −6.0 | −2.0 | −14.0 | 2.4 | 2.3 |
| Median Volume | 17.0 | 12.8 | 12.6 | 10.6 | 11.0 |
| Melt Index | 8.8 | 39.6 | 38.4 | 36.3 | 180.0 |

Jet Milling Conditions: 80 psi; 3 grams/min.
Uncoated ferrite carrier
Compounding Conditions: 15 min. at 125 C.
8% Regal 300 carbon It will be appreciated that Examples 4 and 5 which correspond to formulations made in accordance with the present invention exhibit both positive changes (e.g. 2.4 and 2.3, respectively) and improved flow/toughness balance as compared to either the examples having no rosin (Examples 1 and 2) or the examples using a suspension polymerized styrene acrylic resin (Examples 2 and 3). The examples of TABLE I thus show the importance to the present invention of both (1) the presence of rosin; and (2) the use of a solution polymerized styrene acrylic resin (as opposed to a suspension polymerized resin).

The importance of mixing the styrene acrylic resin and rosin in a solvent solution is exemplified in TABLE 2 which shows the results of melt blending the RP-1215 and rosin as opposed to solution blending (as is the case in Examples 4 and 5 of TABLE (1). In TABLE 2, the RP-1215, rosin and carbon were dry blended and then compounded on a two roll mill for 15 minutes at 125° C.

TABLE 2

| | Example 6 | Example 7 |
|---|---|---|
| RP-1215 | 71.8 | 55.2 |
| Rosin | 20.2 | 36.8 |
| Carbon | 8.0 | 8.0 |
| Q/M | −1.6 | 0.6 |
| Median Volume | 11.0 | 8.2 |
| Melt Index | 120.0 | 395.0 |

Jet Milling Conditions: 80 psi; 3 grams/min.
Uncoated ferrite carrier
Compounding Conditions: 15 min. at 125 C.
8% Regal 300 carbon As is clear from TABLE 2, melt blended Examples 6 and 7 show charges of −1.6 and +0.6, respectively as compared to solution blended Examples 4 and 5 exhibiting charges of +2.4 and +2.3. Similarly, the desirable melt flow/toughness balance of Examples 5 and 6 are not achieved by melt blending rosin with styrene acrylic under typical toner manufacturing conditions.

It has also been experimentally determined that not only should the styrene acrylic and rosin be blended in solution, but the styrene acrylic resin itself should remain in its polymerization solution when mixed with the rosin. TABLE 3 demonstrates the necessity of using the solution polymers for rosin modification of the styrene acrylics if the advantageous properties are to be obtained. In Example 9, RP-1215 was steam stripped under the same conditions which are used for the rosin modification reaction to produce dry polymer. The dried polymer was then dissolved in toluene and the rosin modification reaction was carried out. The product from the predried RP-1215 (Example 9) did not exhibit the properties obtained when using undried RP-1215 (Example 8). The charge is negative with the predried product and the product is more brittle as shown by the smaller particle size after grinding under identical conditions.

TABLE 3

| POLYMER | CHARGE | PARTICLE SIZE | EXAMPLE |
|---|---|---|---|
| RP-1215 | +2.6 | 11.0 | 8 |
| RP-1215 DRIED | −1.4 | 9.9 | 9 |

Both Examples 8 and 9 contain 40% rosin.

In all of Examples 1-9, melt index was determined using ASTM D1238-79; particle size was determined using ASTM F577-78; and charge was determined as follows:

The developer polarity and triboelectric value is measured by using a Faraday cage which can hold the carrier and allow the Dry Ink to pass through screened openings when compressed air is applied. The charge is measured in volts and the value is reported with respect to polarity and calculated triboelectric value (micro coulombs per gram of Dry Ink removed) using the equation:

$$\text{Triboelectric value volts/g} = \frac{(\text{Voltage}) \times (\text{Capacitance})}{(\text{Weight of toner blown off})}$$

As is clear from the foregoing examples, a dry toner composition formed from the toner binder of the present invention will have several important features and advantages including an inherent positive charge so as to minimize the amount of charge controlling dye which must be added to the toner; and an improved compatibility for more uniform dispersal of the dye and uniform charging of the toner particles thereby reducing undesirable fogging or tracking phenomena.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A toner binder composition, comprising:
   a styrene acrylic copolymer/rosin adduct made by the process of:
   dissolving a rosin in a polymerization solution, said polymerization solution comprising a solution polymerized styrene acrylate of methacrylate copolymer with up to 10 weight percent of acrylic or methacrylic acid copolymer and its polymerization solvent, to form a homogenous solution; and
   heating the homogenous solution to remove the solvents and form the adduct.

2. The composition of claim 1, wherein the heating step comprises steam stripping.

3. The composition of claim 1, wherein the homogenous solution is heated to at least 250° C.

4. The composition of claim 1, wherein the rosin comprises gum rosin.

5. The composition of claim 1, wherein the styrene acrylic copolymer comprises a copolymer of styrene monomer and an acrylate commonomer selected from the group consisting of ethyl acrylate, ethyl, methacrylate, butyl acrylate and butyl methacrylate.

6. The composition of claim 1, wherein the solvent is toluene or xylene.

7. The composition of claim 1, further comprising adding an additional solvent to the polymerization solution, said additional solvent comprising toluene or xylene.

8. The composition of claim 1, further comprising:
   at least one coloring pigment; and
   at least one carrier; and wherein
   said toner binder composition comprises a dry toner binder composition.

9. The composition of claim 8, wherein the carrier is selected from the group consisting of iron powder and glass beads.

10. The composition of claim 1, wherein the styrene acrylate or methacrylate copolymer with up to 10 weight percent acrylic or methacrylic acid/rosin adduct exhibits a positive charge.

11. The composition of claim 10, wherein the positive charge is at least 2 volts/gram adduct.

* * * * *